US011685394B2

(12) United States Patent
Schumacher

(10) Patent No.: US 11,685,394 B2
(45) Date of Patent: Jun. 27, 2023

(54) SYSTEM AND METHOD FOR NOTIFYING A VEHICLE OCCUPANT ABOUT A SEVERITY AND LOCATION OF POTENTIAL VEHICLE THREATS

(71) Applicant: Stoneridge Electronics, AB, Solna (SE)

(72) Inventor: Darren Andrew Schumacher, Ann Arbor, MI (US)

(73) Assignee: STONERIDGE ELECTRONICS, AB, Solna (SE)

( * ) Notice: Subject to any disclaimer, the term of this patent is extended or adjusted under 35 U.S.C. 154(b) by 0 days.

(21) Appl. No.: 17/385,305

(22) Filed: Jul. 26, 2021

(65) Prior Publication Data

US 2022/0032945 A1 Feb. 3, 2022

Related U.S. Application Data

(60) Provisional application No. 63/058,208, filed on Jul. 29, 2020.

(51) Int. Cl.
*B60W 50/14* (2020.01)
*B60K 35/00* (2006.01)
*B60R 1/12* (2006.01)

(52) U.S. Cl.
CPC ............. *B60W 50/14* (2013.01); *B60K 35/00* (2013.01); *B60R 1/12* (2013.01);
(Continued)

(58) Field of Classification Search
CPC .... B60R 1/00; B60R 1/06; B60R 1/07; B60R 1/08; B60R 1/082; B60R 1/10;
(Continued)

(56) References Cited

U.S. PATENT DOCUMENTS 9,718,405 B1 * 8/2017 Englander ............... B60R 1/008
2005/0273263 A1 * 12/2005 Egami ..................... G08G 1/163
340/436

(Continued)

FOREIGN PATENT DOCUMENTS

CN 107226027 B 10/2017

OTHER PUBLICATIONS

NPL Search.*
(Continued)

*Primary Examiner* — Van T Trieu
(74) *Attorney, Agent, or Firm* — Carlson, Gaskey & Olds, P.C.

(57) ABSTRACT

An example method includes detecting a potential threat to a vehicle that is external to the vehicle, determining a severity level of the potential threat and a location of the potential threat relative to the vehicle, and displaying an indication of the potential threat on an electronic display in a particular portion of the electronic display corresponding to the location and with a particular display attribute corresponding to the severity level. The particular portion is one of a plurality of different portions of the electronic display each corresponding to different threat locations, and the particular display attribute is one of a plurality of different display attributes corresponding to different severity levels. A corresponding system that detects and displays notifications of potential threats is also disclosed.

20 Claims, 6 Drawing Sheets

(52) U.S. Cl.
CPC .. *B60K 2370/178* (2019.05); *B60K 2370/188* (2019.05); *B60K 2370/33* (2019.05); *B60R 2001/1215* (2013.01); *B60R 2001/1253* (2013.01); *B60R 2300/8046* (2013.01); *B60R 2300/8093* (2013.01); *B60W 2050/146* (2013.01)

(58) Field of Classification Search
CPC .... B60R 1/12; B60Q 1/00; B60Q 9/00; B60K 35/00; B60W 50/14; G08G 1/00; G08G 1/09; G08G 1/0962; G08G 1/16; G08B 23/00; G09G 5/00
See application file for complete search history.

(56) References Cited

U.S. PATENT DOCUMENTS

| | | | |
|---|---|---|---|
| 2008/0046150 A1* | 2/2008 | Breed | B60R 21/0134 701/45 |
| 2010/0289632 A1* | 11/2010 | Seder | G06V 10/95 382/104 |
| 2015/0314783 A1 | 11/2015 | Nespolo et al. | |
| 2019/0244040 A1 | 8/2019 | Herrmann et al. | |
| 2019/0381937 A1 | 12/2019 | Rakshit et al. | |
| 2021/0245776 A1 | 8/2021 | Furtado | |

OTHER PUBLICATIONS

International Search Report and Written Opinion for International Patent Application No. PCT/US2021/043180 dated Oct. 26, 2021.
International Preliminary Report on Patentability for International Patent Application No. PCT/US2021/043180 dated Feb. 9, 2023.

* cited by examiner

SYSTEM AND METHOD FOR NOTIFYING A VEHICLE OCCUPANT ABOUT A SEVERITY AND LOCATION OF POTENTIAL VEHICLE THREATS

CROSS-REFERENCE TO RELATED APPLICATIONS

This disclosure claims the benefit of U.S. Provisional Application No. 63/058,208, filed on Jul. 29, 2020, the disclosure of which is incorporated herein by reference in its entirety.

BACKGROUND

This application relates to vehicles, and more particularly to a system and method for notifying a vehicle occupant about a severity and location of a potential threat to the vehicle.

Drivers of vehicles, such as commercial vehicles, are increasingly presented with large quantities of information describing an environment surrounding the vehicle. This information may be presented on various displays in the vehicle, such as a vehicle instrument cluster and/or displays of a camera monitor system (CMS) that replace or supplement traditional vehicle mirrors. A commercial vehicle, for example, may include multiple sensors, such as radars, camera, ultrasonics, and other sensors to create an understanding of the environment around the vehicle. The information provided to the driver may come from many sources, such as road data that is wirelessly received and/or the sensors described above. Distilling this information for presentation to a driver in a manner that minimizes driver distraction presents challenges.

SUMMARY

A method according to an example of the present disclosure includes detecting a potential threat to a vehicle that is external to the vehicle and determining a severity level of the potential threat and a location of the potential threat relative to the vehicle. The method includes displaying an indication of the potential threat on an electronic display in a particular portion of the electronic display corresponding to the location and with a particular display attribute corresponding to the severity level. The particular portion is one of a plurality of different portions of the electronic display each corresponding to different threat locations, and the particular display attribute is one of a plurality of different display attributes corresponding to different severity levels.

In a further embodiment of any of the foregoing embodiments, the determining of the location of the potential threat relative to the vehicle includes determining which of a plurality of border areas of the vehicle is closest to the potential threat, where the particular portion of the electronic display corresponds to the determined border area.

In a further embodiment of any of the foregoing embodiments, each of the plurality of display portions are border regions of the electronic display that each correspond to a respective one of the border areas of the vehicle.

In a further embodiment of any of the foregoing embodiments, the plurality of border regions includes an upper left border region of the electronic display corresponding to a front left corner area of the vehicle, an upper right border region of the electronic display corresponding to a front right corner area of the vehicle, a lower left border region of the electronic display corresponding to a rear left area of the vehicle, and a lower right border region of the electronic display corresponding to a rear right area of the vehicle.

In a further embodiment of any of the foregoing embodiments, the plurality of display attributes includes a plurality of different colors, each corresponding to a different severity level.

In a further embodiment of any of the foregoing embodiments, the plurality of colors includes a first color corresponding to a first severity level and a second color that is different from the first color and corresponds to a second severity level that is lower than the first severity level. The method includes illuminating border regions of the electronic display corresponding to border areas of the vehicle for which no potential threat is detected using a third color that is different than the first and second colors.

In a further embodiment of any of the foregoing embodiments, the method includes displaying a schematic image of the vehicle and a schematic image of the potential threat on the electronic display.

In a further embodiment of any of the foregoing embodiments, the electronic display includes one or more of an instrument cluster display and a camera mirror replacement display.

In a further embodiment of any of the foregoing embodiments, the plurality of display attributes includes a plurality of display patterns or sequences, each of which correspond to different severity levels.

A system for a vehicle according to an example of the present disclosure includes an electronic display configured for viewing by a driver of the vehicle, at least one sensor configured to obtain information indicative of an environment surrounding the vehicle, and a computing device operatively connected to the electronic display and at least one sensor. The computing device is configured to determine, based on the information from the at least one sensor, a potential threat to the vehicle, a severity level of the potential threat, and a location of the potential threat relative to the vehicle. The computing device is configured to display an indication of the potential threat on the electronic display in a particular portion of the electronic display corresponding to the location, and with a particular display attribute corresponding to the severity level. The particular portion is one of a plurality of different portions of the electronic display each corresponding to different threat locations, and the particular display attribute is one of a plurality of different display attributes corresponding to different severity levels.

In a further embodiment of any of the foregoing embodiments, to determine the location of the potential threat, the computing device is configured to determine which of a plurality of border areas of the vehicle is closest to the potential threat, where the particular portion of the electronic display corresponds to the determined border area.

In a further embodiment of any of the foregoing embodiments, each of the plurality of display portions are border regions of the electronic display that each correspond to a respective one of the border areas of the vehicle.

In a further embodiment of any of the foregoing embodiments, the plurality of border regions include an upper left border region of the electronic display corresponding to a front left corner area of the vehicle, an upper right border region of the electronic display corresponding to a front right corner area of the vehicle, a lower left border region of the electronic display corresponding to a rear left area of the vehicle, and a lower right border region of the electronic display corresponding to a rear right area of the vehicle.

In a further embodiment of any of the foregoing embodiments, the plurality of display attributes includes a plurality of different colors, each corresponding to a different severity level.

In a further embodiment of any of the foregoing embodiments, the plurality of colors includes a first color corresponding to a first severity level and a second color that is different from the first color and corresponds to a second severity level that is lower than the first severity level. The computing device is configured to illuminate border regions of the electronic display corresponding to border areas of the vehicle for which no potential threat is detected using a third color that is different than the first and second colors.

In a further embodiment of any of the foregoing embodiments, the computing device is configured to display a schematic image of the vehicle and a schematic image of the potential threat on the electronic display.

In a further embodiment of any of the foregoing embodiments, the electronic display includes one or more of an instrument cluster display and a camera mirror replacement display.

In a further embodiment of any of the foregoing embodiments, the plurality of display attributes includes a plurality of display patterns or sequences, each of which correspond to different severity levels.

A method according to an example of the present disclosure includes detecting a potential threat to a vehicle that is external to the vehicle, determining a severity level of the potential threat and a location of the potential threat relative to the vehicle, selecting one of a plurality of border regions of an electronic display in the vehicle based on the location, and illuminating the selected border region of the electronic display using a color corresponding to the severity level of the potential threat.

In a further embodiment of any of the foregoing embodiments, each of the plurality of border regions corresponds to a respective one of a plurality of border areas of the vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
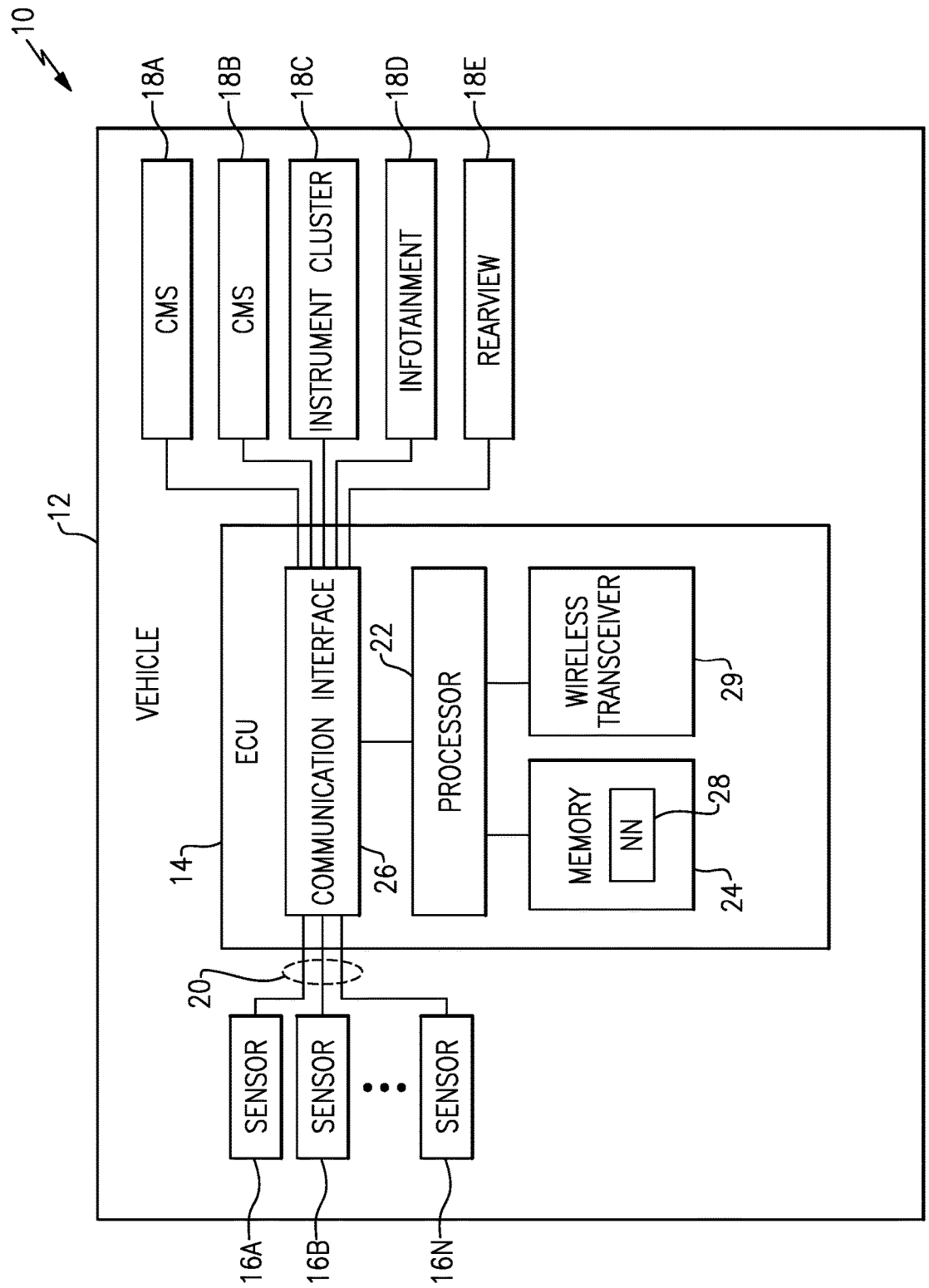
FIG. 1 is a schematic view of a system for detecting and providing notifications of potential threats to a vehicle.

FIG. 1 is a schematic view of a system 10 for detecting potential threats to a vehicle 12 and providing notifications of the potential threats that indicate a magnitude of the threats and a direction of the threats relative to the vehicle. The system 10 includes a computing device 14 (e.g., an electronic control unit "ECU") that is in communication with a plurality of sensors 16A-N and a plurality of displays 18A-E that are viewable by a driver in a cabin of the vehicle 12.

The sensors 16A-N could include cameras, radar sensors, and/or ultrasonic sensors (e.g., lidar), for example. In the example of FIG. 1, the displays 18 include two camera monitor system (CMS) displays 18A-B that are part of CMS (e.g., MirrorEye® from Stoneridge®) that supplements or replaces traditional exterior vehicle mirrors, an instrument cluster display 18C, an infotainment display 18D, and a rearview display 18E that is situated in the traditional location of a rearview mirror. Of course, it is understood that other types and quantities of electronic displays 18 could be used.

In one example, the plurality of sensors 16A-N communicate with the computing device 14 over a communication bus 20, such as a Controller Area Network (CAN) bus.

The computing device 14 includes a processor 22 operatively connected to memory 24, a communication interface 26, and a wireless transceiver 29. The processor 22 includes processing circuitry to process data from the sensors 16, detect potential threats to the vehicle 12, determine a severity level of the potential threats, and determine a location of the potential threats relative to the vehicle 12. The processor 22 may include one or more microprocessors, microcontrollers, application specific integrated circuits (ASICs), or the like, for example.

The memory 24 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 24 may incorporate electronic, magnetic, optical, and/or other types of storage media. The memory 24 can also have a distributed architecture, where various components are situated remotely from one another, but can be accessed by the processor 22. The memory 24 includes a neural network 28 for processing data from the sensors 16 and detecting potential threats to the vehicle 12, e.g., using object detection techniques that are known in the art.

The communication interface 26 is configured to facilitate communication between the computing device 14, sensors 16, and displays 18.

The wireless transceiver 29 is configured to receive data regarding information such as road obstacles, road conditions, nearby accidents, GPS information, etc. In one example, the computing device 14 is operable to detect potential threats based on information received from the wireless transceiver 29 (e.g., if the vehicle 12 is approaching a road obstacle based on GPS data of the obstacle and the vehicle 12).

Figure 2:
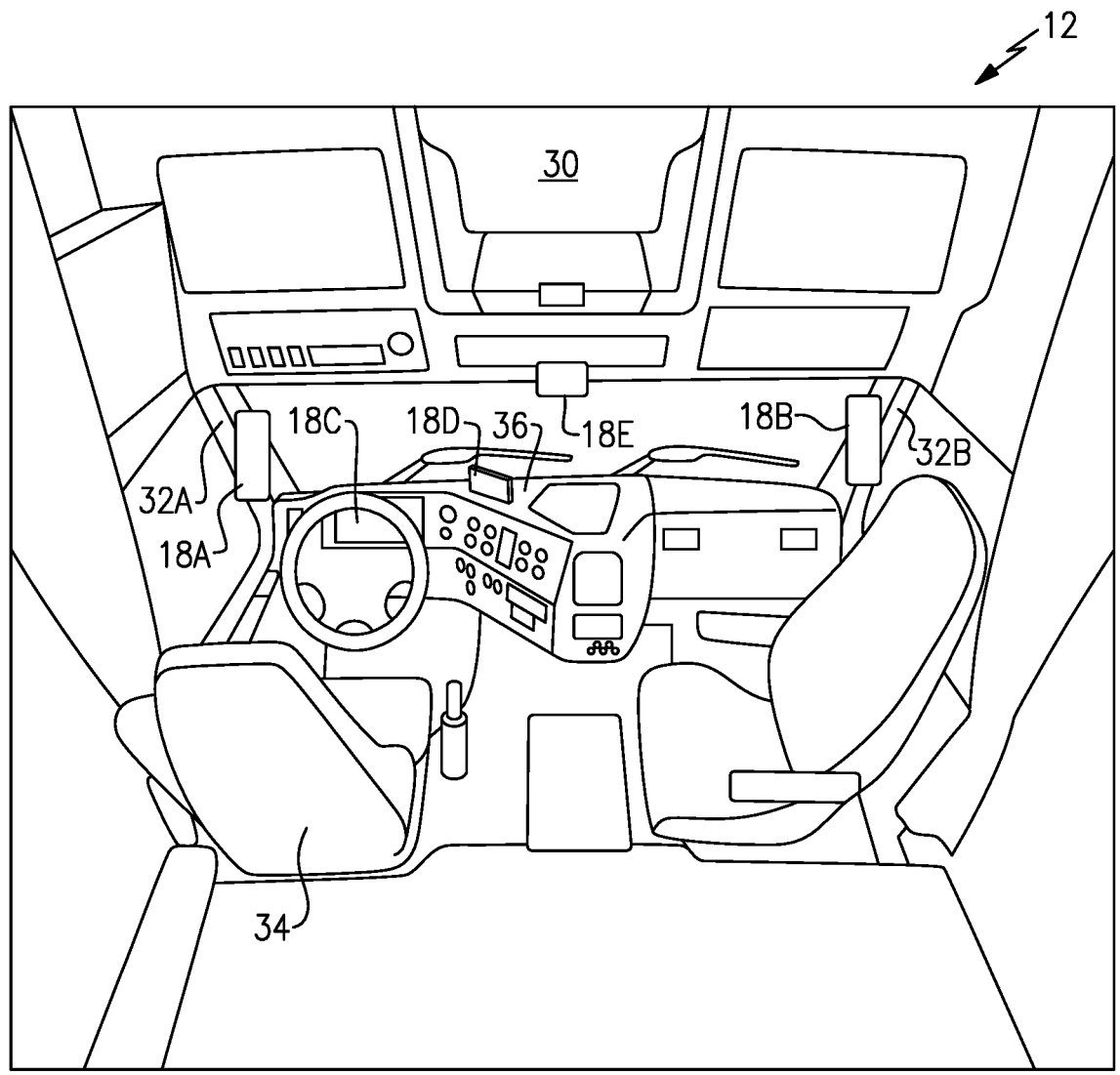
FIG. 2 is a schematic view of example electronic display locations in a cabin of a vehicle.

FIG. 2 is a schematic view of example locations for the displays 18A-E within a cabin 30 of an example vehicle 12. In the example of FIG. 2, the cabin 30 is within a tractor portion of a commercial vehicle. As shown in FIG. 2, CMS displays 18A-B are mounted to A-pillars 32A-B of the vehicle 12. Instrument cluster display 18C is disposed in front of a driver seat 34. Infotainment display 18D is provided on a dashboard 36 of the vehicle cabin 30. Rearview display 18E is provided in a traditional rearview mirror location. Of course, these are only example displays and display locations, and it is understood that other quantities of displays and/or other display locations in the vehicle cabin 30 could be used.

Figure 3:
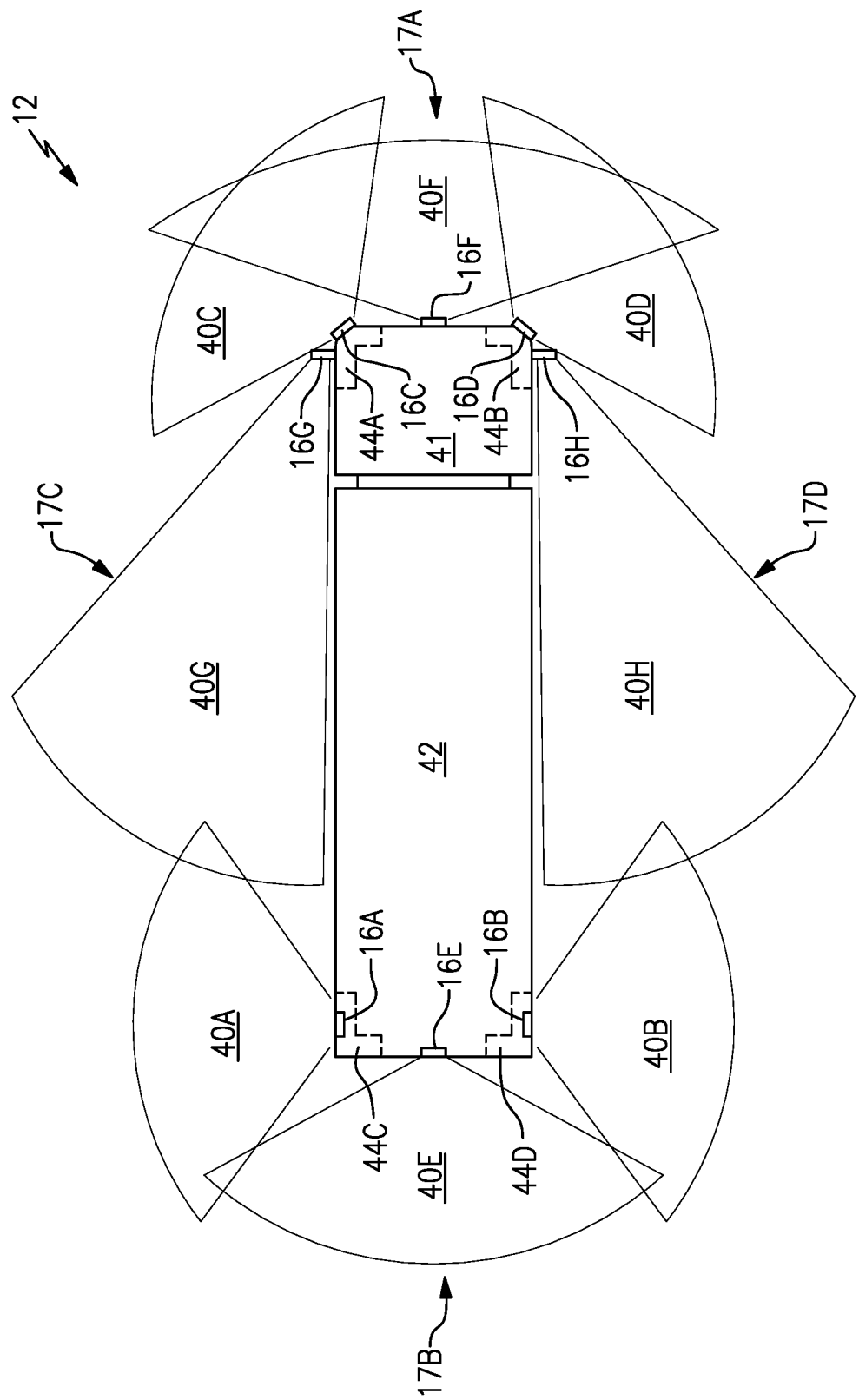
FIG. 3 is a schematic view of example sensor locations for a vehicle.

FIG. 3 is a schematic view of example locations for the sensors 16 and approximations of their respective detection areas 40 for an example commercial vehicle 12 that includes a tractor 41 and a trailer 42. As shown in FIG. 3, the vehicle 12 has a front side 17A, rear side 17B, left side 17C, and right side 17D. As used herein, relative positions such as left, right, front, and rear, are discussed with reference to a vehicle operator facing a front of the vehicle 12. Sensors 16A-B, which have associated detection areas 40A-B are provided in the rear corners of the trailer 42 of the vehicle 12. Sensors 16C-D, which have associated detection areas 40C-D are provided in the front corners of the tractor 41 of the vehicle 12. Sensor 16E, which has associated detection area 40E, is provided in a rear of the trailer 42 of the vehicle 18. Sensor 16F, which has associated detection area 40F, is provided in a front of the tractor 41 of the vehicle 12. Sensors 16G-H are CMS camera sensors, and have associated detection areas 40G-H.

The vehicle 12 includes a plurality of border areas 44A-D, which include a front left border area 44A, a front right border area 44B, a rear left border area 44C, and a rear right border area 44C. These example border areas 44 will be discussed in greater detail below. Although some example border areas are shown in FIG. 3, it is understood that these are non-limiting examples, and that other border areas could be used.

Figure 4:
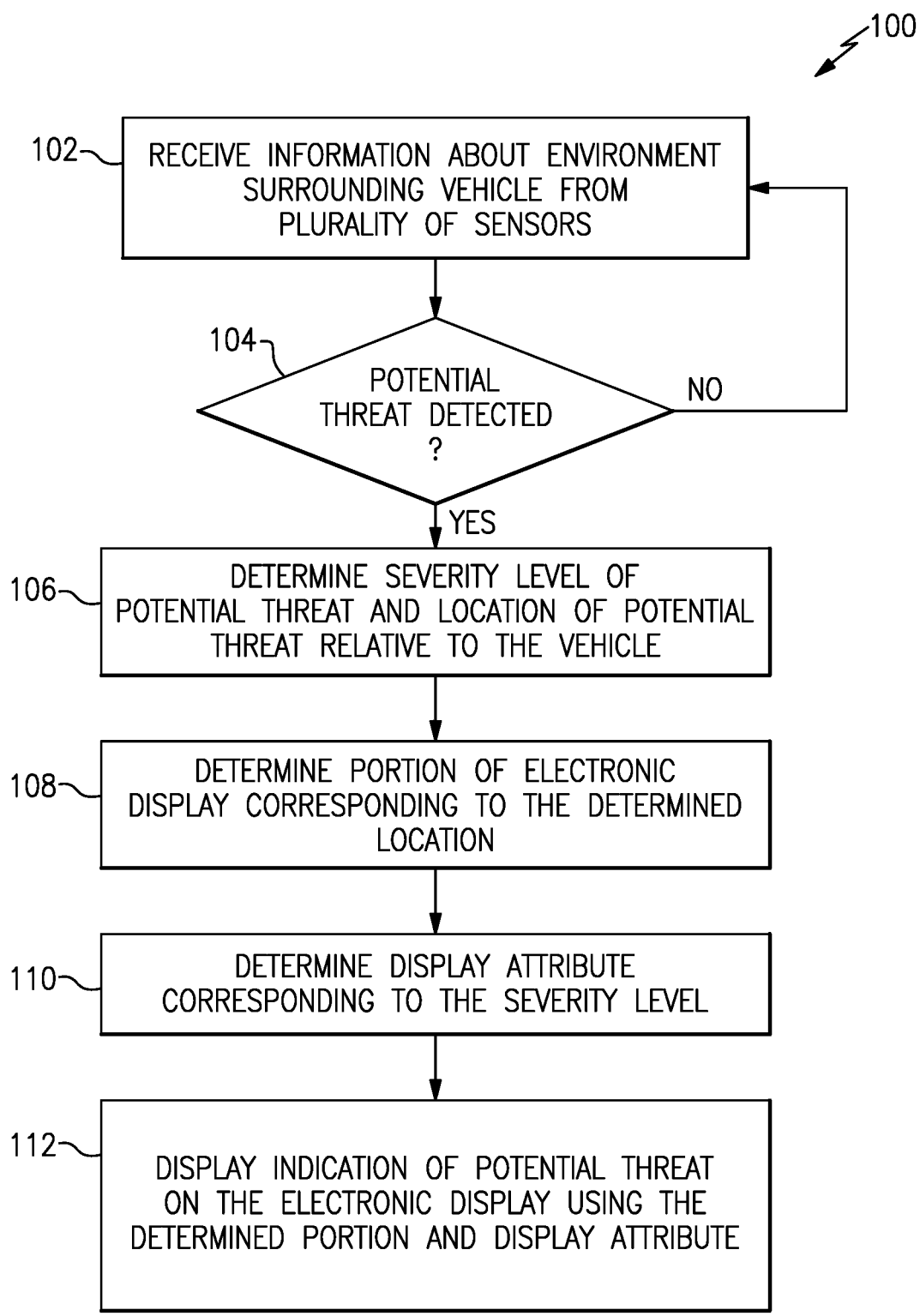
FIG. 4 is a flowchart of an example method for notifying a vehicle occupant about the severity and location of a potential threat to the vehicle.

FIG. 4 is a flowchart 100 of an example method performed by the computing device 14 for notifying a vehicle occupant about the severity and location of a potential threat to the vehicle 12. The computing device 14 receives information about an environment surrounding the vehicle 12 from the plurality of sensors 16A-N and/or from the wireless transceiver 29 (step 102), and analyzes the information to determine if a potential threat is detected (step 104).

Step 104 could include performing object detection and comparing data received from the sensors 16 to predefined threat criteria to make determinations such as whether a collision is likely. For example, if another vehicle is within X feet of the vehicle 12 and is approaching the vehicle 12 at a speed of Y, that may constitute a threat with a severity of 2, whereas the if the same vehicle is approaching the vehicle 12 at a speed of Z that is less than the speed of Y that may constitute either a threat of severity of 1 or a non-threat because a collision is unlikely. Other potential vehicle threats could include road obstacles, which may be detected through data received by the wireless transceiver 29. Some example road obstacles could include stalled or crashed vehicles and/or adverse road conditions such as known icy patches and/or flooding.

If no potential threat is detected (a "no" to step 104), the computing device 14 continues receiving and monitoring the information of step 102 to monitor for potential threats.

Otherwise, if a potential threat is detected (a "yes" to step 104), the computing device 14 determines a severity level of the potential threat, and also determines a location of the potential threat relative to the vehicle 12 (step 106).

The computing device 14 determines a portion of one or more of the electronic displays 18 that correspond to the determined location of the potential threat (step 108). The particular portion that is determined in step 108 for each of the one or more electronic displays 18 is one of a plurality of different portions of the electronic display 18 corresponding to different threat locations.

The computing device 14 also determines a display attribute corresponding to the severity level of the potential threat (step 110). The particular display attribute determined in step 110 is one of a plurality of different display attributes corresponding to different severity levels (e.g., colors, patterns, and/or sequences, such as flashing). With the example of flashing, the rate of flashing and/or the color used for the flashing could change depending on the severity level.

The computing device 14 displays an indication of the potential threat on the electronic display 18 using the determined portion of the electronic display 18 from step 108 and the determined display attribute from step 110 (step 112).

In one example, determining the location of the potential threat relative to the vehicle in step 106 includes determining which of the plurality of border areas 44A-D of the vehicle 12 is closest to the potential threat. In this regard, it is understood that the border areas 44A-D shown in FIG. 3 are only examples, and that other border areas could be used (e.g., that are between adjacent ones of the areas 44A-D).

In one example, the computing device 14 also provides an audible and/or physical warning (e.g., steering wheel vibration) in conjunction with providing the notification on the electronic display 18.

In one example, the particular portion of the electronic display that is determined in step 108 corresponds to a border area 44 of the electronic display 18. One such example is shown in FIG. 5.

Figure 5:
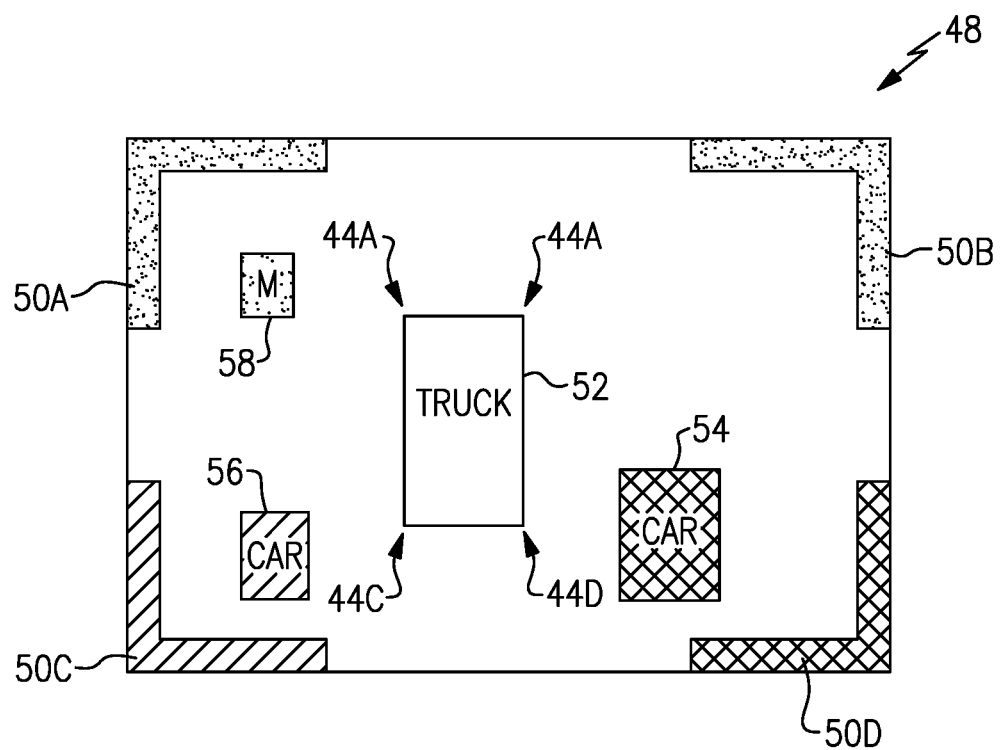
FIG. 5 is a first example image depicting a severity of a potential threat to a vehicle and a location of the potential threat relative to the vehicle.

Referring now to FIG. 5, an example image 48 for an electronic display 18 is shown. The image 48 includes a plurality of border regions 50A-D. In the example of FIG. 5, display border region 50A corresponds to vehicle front left border area 44A, display border region 50B corresponds to vehicle front right border area 44B, display border region 50C corresponds to vehicle rear left border area 44C, and display border region 50D corresponds to vehicle rear right border area 44D.

The image 18 is a birds-eye image that schematically illustrates the vehicle 12 as a truck 52, and illustrates a plurality of objects 54, 56, 58 which represent objects detected in the vicinity of the vehicle 12. The objects include a first car 54, a second car 56, and a motorcycle 58.

For the discussion below, assume that cars 54 and 56 are determined to be potential threats, with car 54 having a severity level of 2 (e.g., because it is within a predefined distance of the truck 52 and is approaching the truck at a speed that exceeds a predefined threshold) and car 56 having a severity level of 1 which is lower than the severity level of 2 (e.g., because it is within a predefined distance of the truck 52 and is accelerating towards the truck 52), and that the motorcycle 58 is not deemed to be a potential threat (e.g., it has a threat level that is below a predefined threshold).

The computing device 14 determines that the car 54 is closest to vehicle border area 44D, and therefore selects display border region 50D which corresponds to vehicle border area 44D, and illustrates display border region 50D with a display attribute corresponding to the severity level of 2. In the example of FIG. 5, this is cross-hatching, but could alternatively or in addition include a color such as red.

The computing device 14 determines that the car 56 is closest to vehicle border area 44C, and therefore selects display border region 50C which corresponds to vehicle border area 44, and illustrates display border region 50C with a display attribute corresponding to the severity level of 1. In the example of FIG. 5, this is non-crossed hatching, but could alternatively or in addition include a color such as yellow.

The computing device 14 determines that motorcycle 58 is not a potential threat to the vehicle 12 (e.g., because the motorcycle 58 is getting farther apart from the truck 52), and therefore depicts the motorcycle 58 with a display attribute indicating a non-threat. In the example of FIG. 5, this is a dotted shading, but could alternatively or in addition include a color such as green. Because border areas 50B also does not have a corresponding potential threat, it is depicted with the same display attribute as display border region 50A.

Figure 6:
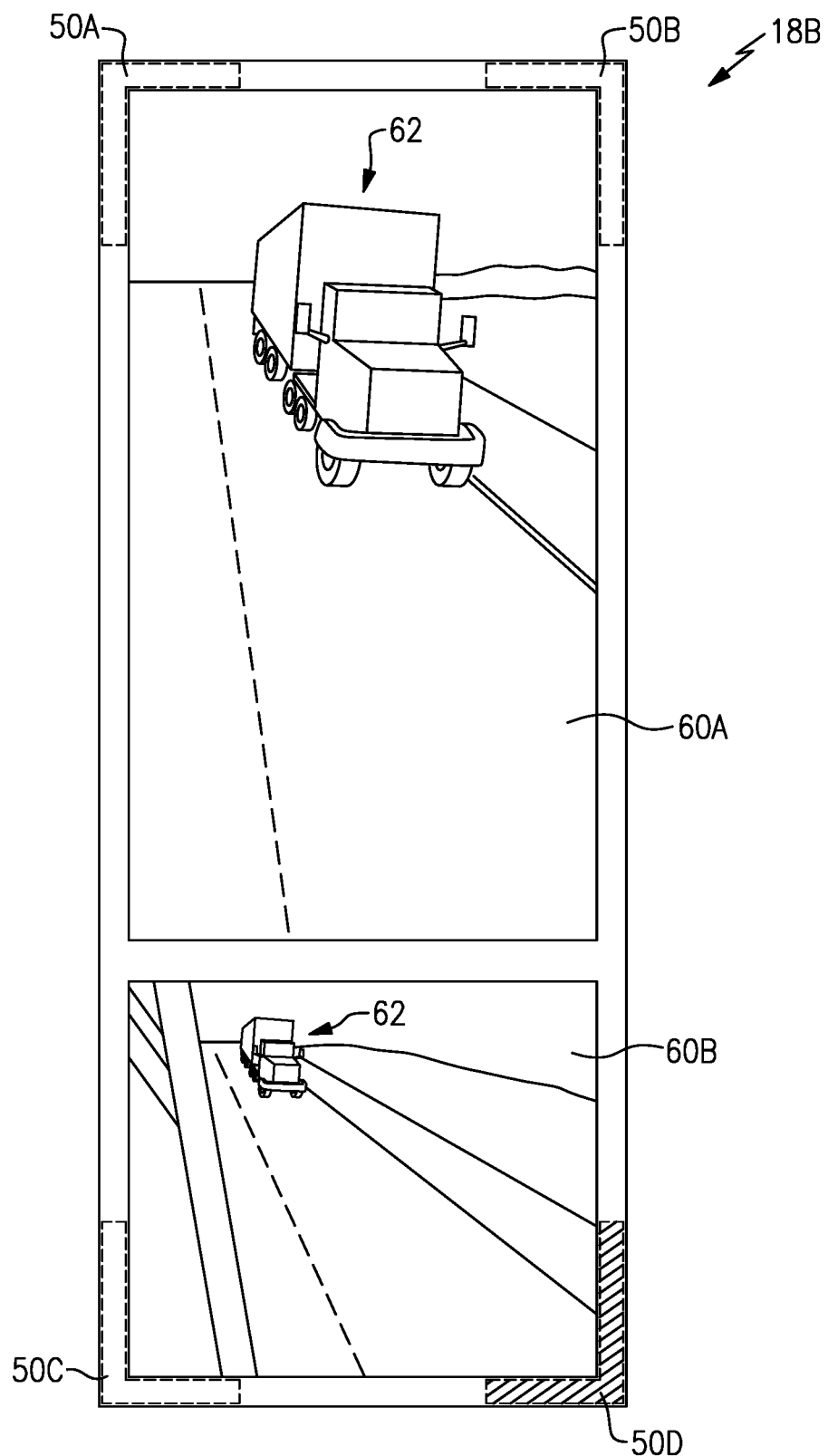
FIG. 6 is a second example image depicting a severity of a potential threat to a vehicle and a location of the potential threat relative to the vehicle.

FIG. 6 illustrates an example of how the method 100 could be performed in conjunction with CMS display 18B as shown in FIG. 2, which does not utilize a birds-eye view. The display 18B includes a first display area 60A corresponding to Class II view and a second display area 60B corresponding to a Class IV wide angle view. A truck 62 is depicted in each display area 60A-B. Assume for the discussion below that the computing device 14 determines that the truck 62 corresponds to a severity level 1 potential threat, and is closest to the vehicle rear right border area 44D. The computing device 14 depicts display border region 50D, which corresponds to vehicle rear right border area 44D, using a display attribute corresponding to the severity level of 1. Optionally, display border regions 50A and 50C-D could be illustrated using a non-threat display attribute.

Prior art systems rely on notifications such as a simple light (e.g., blind spot detection systems which activate a light in the corner of the rear view mirror) or an audio warning (e.g., a beep or tone varying in magnitude based on severity of the perceived threat). Still other systems will shake the seat or steering wheel. These warnings, however, are by themselves insufficient for a vehicle such as a commercial vehicle which may include one or more trailers, because the size of the vehicle may render these warnings useless, as the warning does not communicate a severity of danger or a location of the threat sufficient to provide the driver with time to take action.

Furthermore, for a commercial vehicle, where the amount of area which needs to be observed by the vehicle's sensors is larger compared to a passenger vehicle, the lack of specificity of the warning may results in the system being deactivated by the driver. Moreover, some drivers may find non-specific warnings to be distracting.

The present disclosure improves upon prior art systems by clearly conveying information about the severity and location of a potential threat to a vehicle. This enables drivers to assess the location and severity of the threat and to react quickly (e.g., on the order of half a second).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method comprising:
    detecting a potential threat to a vehicle that is external to the vehicle;
    determining a severity level of the potential threat and a location of the potential threat relative to the vehicle; and
    displaying an indication of the potential threat on an electronic display in a particular portion of the electronic display corresponding to the location and with a particular display attribute corresponding to the severity level;
    wherein:
        the particular portion is one of a plurality of different portions of the electronic display each corresponding to different respective threat locations around the vehicle, and the particular display attribute is one of a plurality of different display attributes corresponding to different severity levels;
        said determining a location of the potential threat relative to the vehicle comprises determining which of a plurality of border areas of the vehicle is closest to the potential threat; and
        the particular portion of the electronic display corresponds to the determined border area.

2. The method of claim 1, wherein each of the plurality of portions of the electronic display are border regions of the electronic display that each correspond to a respective one of the border areas of the vehicle.

3. The method of claim 2, wherein the plurality of border regions include:
    an upper left border region of the electronic display corresponding to a front left corner area of the vehicle;
    an upper right border region of the electronic display corresponding to a front right corner area of the vehicle;
    a lower left border region of the electronic display corresponding to a rear left area of the vehicle; and
    a lower right border region of the electronic display corresponding to a rear right area of the vehicle.

4. The method of claim 1, wherein:
    the plurality of display attributes comprises a plurality of different colors, each corresponding to a different severity level.

5. The method of claim 4, wherein:
    the plurality of colors includes a first color corresponding to a first severity level and a second color that is different from the first color and corresponds to a second severity level that is lower than the first severity level; and
    the method includes illuminating border regions of the electronic display corresponding to border areas of the vehicle for which no potential threat is detected using a third color that is different than the first and second colors.

6. The method of claim 1, comprising:
    displaying a schematic image of the vehicle and a schematic image of the potential threat on the electronic display that are both separate from the indication of the potential threat on the electronic display.

7. The method of claim 1, wherein the electronic display includes one or more of an instrument cluster display and a video display that is a mirror replacement.

8. The method of claim 1, wherein the plurality of display attributes includes a plurality of display patterns or sequences, each of which correspond to different severity levels.

9. The method of claim 1, wherein said displaying comprises:
    displaying a first indication for a first potential threat in a first one of the plurality of portions of the electronic display corresponding to a first side of the vehicle; and
    displaying a second indication for a second potential threat in a second one of the plurality of portions of the electronic display corresponding to a second side of the vehicle.

10. A system for a vehicle, comprising:
    an electronic display configured for viewing by a driver of the vehicle;
    at least one sensor configured to obtain information indicative of an environment surrounding the vehicle; and a computing device operatively connected to the electronic display and at least one sensor, and configured to:
  determine, based on the information from the at least one sensor, a potential threat to the vehicle, a severity level of the potential threat, and a location of the potential threat relative to the vehicle; and
  display an indication of the potential threat on the electronic display in a particular portion of the electronic display corresponding to the location, and with a particular display attribute corresponding to the severity level;
wherein:
  the particular portion is one of a plurality of different portions of the electronic display each corresponding to different respective threat locations around the vehicle, and the particular display attribute is one of a plurality of different display attributes corresponding to different severity levels;
  to determine the location of the potential threat, the computing device is configured to determine which of a plurality of border areas of the vehicle is closest to the potential threat; and
  the particular portion of the electronic display corresponds to the determined border area.

11. The system of claim 10, wherein each of the plurality of portions of the electronic display are border regions of the electronic display that each correspond to a respective one of the border areas of the vehicle.

12. The system of claim 11, wherein the plurality of border regions includes:
  an upper left border region of the electronic display corresponding to a front left corner area of the vehicle;
  an upper right border region of the electronic display corresponding to a front right corner area of the vehicle;
  a lower left border region of the electronic display corresponding to a rear left area of the vehicle; and
  a lower right border region of the electronic display corresponding to a rear right area of the vehicle.

13. The system of claim 10, wherein:
the plurality of display attributes comprises a plurality of different colors, each corresponding to a different severity level.

14. The system of claim 13, wherein:
the plurality of colors includes a first color corresponding to a first severity level and a second color that is different from the first color and corresponds to a second severity level that is lower than the first severity level; and
  the computing device is configured to illuminate border regions of the electronic display corresponding to border areas of the vehicle for which no potential threat is detected using a third color that is different than the first and second colors.

15. The system of claim 10, wherein the computing device is configured to display a schematic image of the vehicle and a schematic image of the potential threat on the electronic display that are both separate from the indication of the potential threat on the electronic display.

16. The system of claim 10, wherein the electronic display includes one or more of an instrument cluster display and a video display that is a mirror replacement.

17. The system of claim 10, wherein the plurality of display attributes includes a plurality of display patterns or sequences, each of which correspond to different severity levels.

18. The system of claim 10, wherein the computing device is configured to:
  display a first indication for a first potential threat in a first one of the plurality of portions of the electronic display corresponding to a first side of the vehicle; and
  display a second indication for a second potential threat in a second one of the plurality of portions of the electronic display corresponding to a second side of the vehicle.

19. A method comprising:
  detecting a potential threat to a vehicle that is external to the vehicle;
  determining a severity level of the potential threat and a location of the potential threat relative to the vehicle;
  selecting one of a plurality of border regions of an electronic display in the vehicle corresponding to the location, wherein each of the plurality of border regions corresponds to different respective threat locations around the vehicle; and
  based on the detecting, determining, and selecting, illuminating the selected border region of the electronic display using a color corresponding to the severity level of the potential threat.

20. The method of claim 19, wherein each of the plurality of border regions corresponds to a respective one of a plurality of border areas of the vehicle.

* * * * *